United States Patent
Nieuwenhuizen et al.

(10) Patent No.: US 6,741,295 B2
(45) Date of Patent: May 25, 2004

(54) PREVENTING DOMING PHENOMENA

(75) Inventors: Michel Wouter Nieuwenhuizen, Eindhoven (NL); Dirk Yvon Willem Van Leeuwen, Brugge (BE); Kathleen Lutgarde Luc Van Damme, Brugge (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 375 days.

(21) Appl. No.: 09/878,682

(22) Filed: Jun. 11, 2001

(65) Prior Publication Data

US 2002/0057388 A1 May 16, 2002

(30) Foreign Application Priority Data

Jun. 13, 2000 (EP) .............................. 00202057

(51) Int. Cl.[7] .................................. H04N 5/57
(52) U.S. Cl. ..................... 348/687; 348/672; 348/678; 348/807; 382/168; 358/522
(58) Field of Search ................. 348/687, 672, 348/671, 673, 674, 678, 607, 807, 806, 631, 645, 625, 254, 379, 255, 380; 382/168, 169, 274, 275; 358/522, 521, 523; 345/690, 77; 315/368.11, 368.12, 387, 382.1

(56) References Cited

U.S. PATENT DOCUMENTS

| | | | | |
|---|---|---|---|---|
| 4,369,465 A | * | 1/1983 | Blamoutier et al. | 348/618 |
| 4,996,590 A | * | 2/1991 | Okamoto et al. | 348/645 |
| 5,289,282 A | * | 2/1994 | Tsuji et al. | 348/624 |
| 5,294,986 A | * | 3/1994 | Tsuji et al. | 348/672 |
| 5,315,389 A | * | 5/1994 | Izawa et al. | 348/672 |
| 5,359,369 A | * | 10/1994 | Izawa et al. | 348/672 |
| 5,394,194 A | * | 2/1995 | Izawa et al. | 348/672 |
| 6,038,341 A | * | 3/2000 | Takeshima et al. | 382/168 |
| 6,111,980 A | * | 8/2000 | Sano et al. | 382/167 |
| 6,130,724 A | * | 10/2000 | Hwang | 348/678 |
| 6,148,103 A | * | 11/2000 | Nenonen | 382/169 |
| 6,373,533 B1 | * | 4/2002 | Kawabata et al. | 348/672 |
| 6,463,173 B1 | * | 10/2002 | Tretter | 382/168 |
| 6,504,954 B1 | * | 1/2003 | Goldstein | 382/168 |

FOREIGN PATENT DOCUMENTS

| | | | | |
|---|---|---|---|---|
| EP | 0354518 | 2/1990 | | H04N/5/57 |
| EP | 0525976 | 2/1993 | | G06F/15/68 |
| EP | 0569018 A1 | 5/1993 | | H04N/5/45 |
| EP | 0613294 A1 | 2/1994 | | H04N/5/20 |
| EP | 0772158 A2 | 10/1996 | | G06T/5/40 |

* cited by examiner

Primary Examiner—Michael H. Lee
Assistant Examiner—Jean W. Désir

(57) ABSTRACT

In a method of preventing doming phenomena, luminance histogram distribution values are obtained (10) from a luminance signal, the various luminance histogram distribution values are processed and normalized (12), the luminance histogram distribution values are processed (16) to correct for at least actual contrast and brightness settings to obtain corrected histogram data, a beam current is predicted (18) from the corrected histogram data, and a correction signal is derived (20) from the predicted beam current and making said correction signal effective in the processing and normalizing step (12).

11 Claims, 2 Drawing Sheets

PREVENTING DOMING PHENOMENA

BACKGROUND OF THE INVENTION

1. Field of the Invention

The invention relates to a method and device for preventing doming phenomena. More specifically, the invention relates to circuitry for preventing doming phenomena in a television receiver.

2. Description of the Related Art

European Patent Application No. EP-A-0,525,976, corresponding to U.S. Pat. No. 5,315,389, describes a prior art intensity control circuit for providing conventional intensity correction and has nothing to do with the prevention of dooming phenomena.

Doming phenomena may occur in case a section of the shadow mask of a cathode ray picture tube is irradiated with high intensity electron beams causing partial distortion of the shadow mask whereby a "dome" is formed in the mask. The effect thereof is mis-coloring which is very annoying. Because of the geometry of the tube, the influence of the doming phenomena is rather strong near the periphery of the screen where the electron beam strikes the shadow mask at a relatively large deflection angle.

Electron beams with high intensity are generated in correspondence to a local high luminance signal. To prevent doming phenomena, the luminance signal has to be controlled such that the intensity of the resulting electron beam is limited at least in those regions of the screen where doming is likely to occur.

Circuits which are specifically designed to prevent doming phenomena are already known from the prior art. An example is described in European Patent Application No. EP-A-0,354,518, corresponding to U.S. Pat. No. 4,996,590. The circuit described therein comprises means for processing the luminance signal including a low-pass filter for filtering out only the low frequent components of the luminance signal which, in a first comparator, are compared with a first reference signal related to the horizontal and vertical modulation signals, resulting in a control signal for a charge/discharge circuit which will tend to charge if there are areas on the screen where the luminance will be so high that doming phenomena will appear. The output of this charge/discharge circuit is compared with a second reference level signal resulting into a correction signal, which is used to adapt either the contrast or the luminance of the screen to counteract any doming phenomena.

In this prior art circuit, the first reference signal is generated such that the allowed luminance level is rather large at the center of the screen and is relatively small near the sides of the screen, thereby taking into account that the doming phenomena will appear predominantly near the edges of the screen and not in the center thereof.

SUMMARY OF THE INVENTION

It is, inter alia, an object of the invention to provide an improved doming phenomena prevention.

In a method of preventing doming phenomena in accordance with a first aspect of the present invention, luminance histogram distribution values are obtained from a luminance signal, the various luminance histogram distribution values are processed and normalized, the luminance histogram distribution values are processed to correct for at least actual contrast and brightness settings to obtain corrected histogram data, a beam current is predicted from the corrected histogram data, and a correction signal is derived from the predicted beam current and making said correction signal effective in the processing and normalizing step. Preferably, local doming is prevented by determining local histograms to correct local beam currents for at least two windows (32, 34 in FIG. 2).

Advantageously, a doming phenomena preventing circuit in accordance with the present invention, makes predominantly use of a processor performing calculations on luminance data which are already available in the a histogram memory forming part of the normal intensity control circuit. In many cases, a processor is already present and if said processor has a sufficient spare capacity, the doming preventing circuit according to the invention can be realized without adding any substantial hardware to the television receiver circuit. Loading a suitable program into the already present processor to calculate a correction signal from the available data would then solve a major part of the problem.

These and other aspects of the invention will be apparent from and elucidated with reference to the embodiments described hereinafter.

DESCRIPTION OF THE PREFERRED EMBODIMENTS

Figure 1:
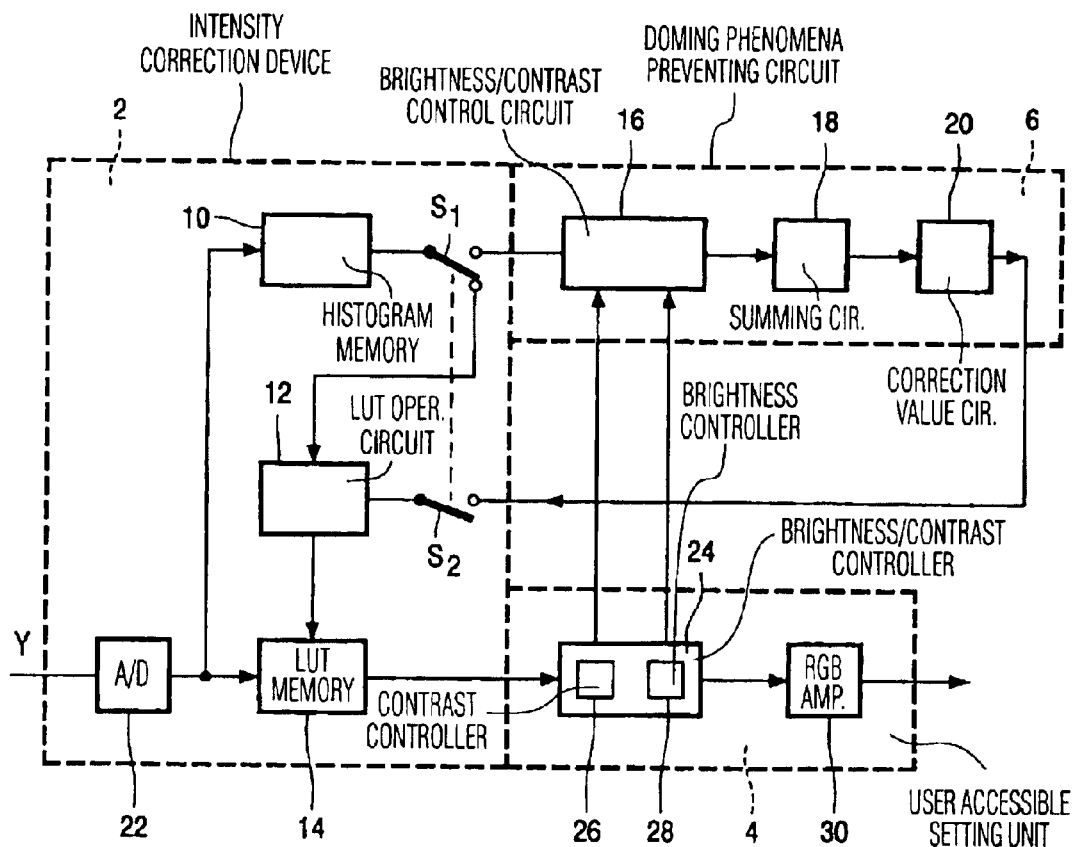
FIG. 1 illustrates a block schematic diagram of circuitry according to the invention.

The circuit in FIG. 1 comprises three parts 2, 4 and 6, part 2 being a conventional intensity correction device, part 4 being a section of a normal television receiver circuit comprising the user accessible setting unit for influencing contrast and brightness, and part 6 comprising the dooming phenomena preventing circuitry according to the invention.

As indicated above, part 2 in FIG. 1 shows the construction of a conventional intensity correction device. The reference numeral 10 denotes a histogram memory for obtaining luminance distribution of an input luminance signal Y, 12 denotes a look-up table operating circuit for cumulating the histogram and normalizing respective data so that the maximum cumulative frequency become coincident with a maximum value of an output luminance signal, 14 denotes a look-up table memory for storing the data normalized by the look-up table operating circuit 12 and permitting reading out of a correction signal corresponding to a luminance level of the input signal. It should be noted that using a look-up table memory is only one of many possible ways to obtain a luminance ratio change, such as, a piece-wise linear technique or a direct application of a non-linear function.

It is assumed, in FIG. 1, that the luminance signal Y is an analog signal which has to be converted into a digital signal by the A/D converter 22. If the luminance signal is already in digital form, the converter 22 can be eliminated.

The functioning of the sub-circuit in part 2 is extensively described in the above-mentioned EP-A-0,354,418 to which the attention is drawn for further reference.

The circuit in FIG. 1 has a second part 4 covering a brightness and contrast controller 24 that includes a contrast controller 26 and a brightness controller 28. The corrected output signal of brightness and contrast controller 24 is supplied to an RGB amplifier 30 to bring the signal at a level suited for activating the actual cathode ray tube control elements.

The third part 6 in FIG. 1 covers an emulated brightness and contrast control circuit 16 receiving input values from the contrast controller 26 and the brightness controller 28 to subject the output signal from the histogram memory 10 to the same corrections as the luminance signal from the look-up table memory 14. After applying said corrections, a summing circuit 18 takes care of providing a weighted sum of all values received. The obtained sum is related to the actual total beam current. The obtained sum is further processed into a correction value in the circuit 20. The obtained correction value is transferred back to the look-up table operating circuit 12 to implement the correction.

The circuit in FIG. 1 finally comprises tandem switches S1, S2. In the illustrated positions, these switches take care that the circuit in part 2 only functions as a normal luminance control circuit of the type known from the prior art. If both switches are thrown into the other position, the circuit in part 2 is combined with the circuit in part 4 and functions as a doming preventing circuit. It will be clear that the switches S1, S2 are operated at a suitable pace such that, on the one hand, the histogram data will be refreshed regularly with a sufficient repetition frequency, whereas, on the other hand, at least part of the histogram data is, at the right moments, available to calculate a correction value and making this calculated value effective for preventing doming phenomena.

Figure 2:
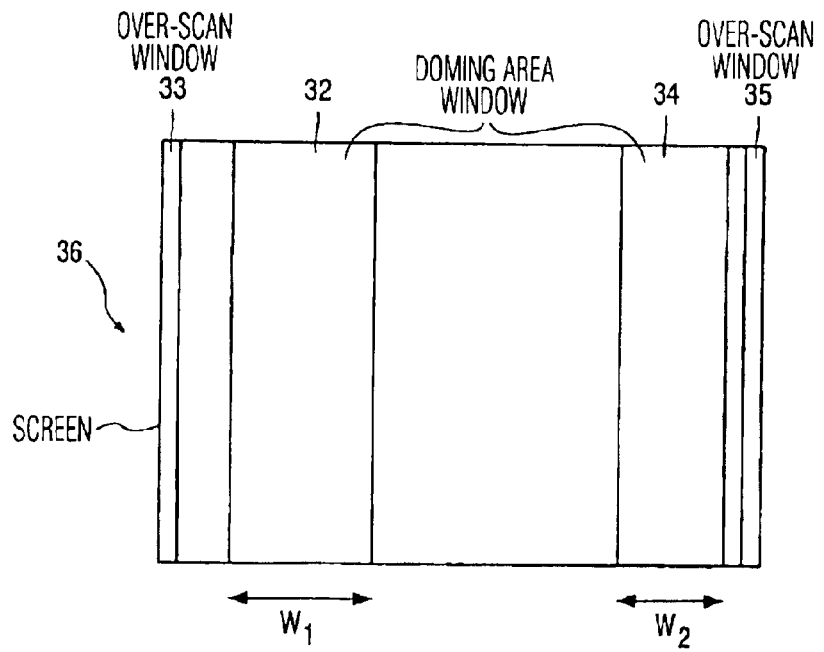
FIG. 2 illustrates, schematically, a screen with the windows in which the circuit according the invention is active.
Figure 3:
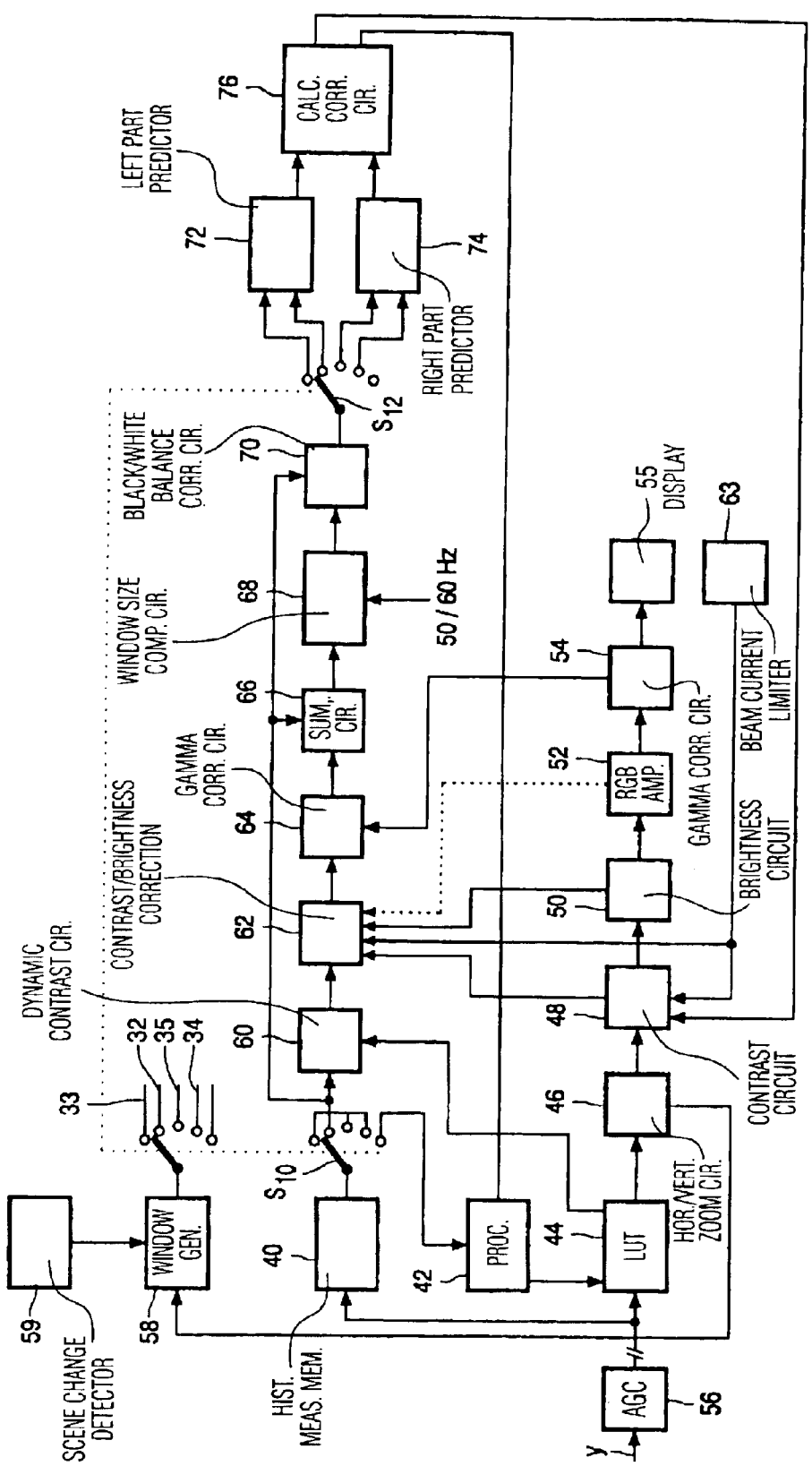
FIG. 3 illustrates a more elaborate circuitry providing a lot of details.

Before describing the more elaborate circuit illustrated in FIG. 3, first the attention is drawn to FIG. 2 illustrating, schematically, the zones on a television screen where doming phenomena are likely to occur. For obtaining information about possible doming phenomena, it is not necessary to guard the whole screen because doming phenomena will occur predominantly in a zone at some distance from the center of the screen where the angle between the electron beam and the shadow mask in front of the screen is substantially smaller then 90 degrees. To avoid unnecessary measurements and processing, it is, therefore, preferred that only parts of the luminance signal related to specific areas on the screen, called windows, are processed by said processing means. More specifically, the windows are a left and right window covering elongated vertical zones near the respective left and right edges of the screen.

In FIG. 2, two windows 32 and 34 are defined on the screen 36 each having a height equal to the height of the television screen 36. The width of window 32 is indicated as W1 and the width of window 34 is indicated as W2. It is not necessary that W1=W2. The object of the circuit, according to the invention, is now to measure the total beam current impinging onto the CRT mask covering each of the windows 32 and 34. If the calculated or estimated total beam value in a window is higher than a predetermined limit, so that it is very likely that doming phenomena will occur, a correction signal can be sent to the luminance control circuit decreasing the luminance on the circuit as a whole and preventing thereby the doming phenomena.

Windows 33 and 35 serve to measure whether the thermic-mechanic compensation of the CRT actually does what it is supposed to do in order to prevent local doming. Suppose the whole left half of the screen is white. In that case, region 33 will be white so that the thermically active suspension of the shadow mask (normally made from a bi-metal) becomes too hot, thereby compensating the local doming in area 32 nearly completely. Again, it is essential that this combination takes place, because otherwise, a false alarm would be given too often. This compensation system makes sense with CRTs having a shadow mask made of iron. For CRTs having a shadow mask made of invar, this compensation is not required, because, for this type of display, the shadow mask is not thermically compensated by means of a bi-metal suspension, but by choosing a material having a low expansion coefficient.

Now further to FIG. 3. In FIG. 3, the histogram intensity control circuit comprises the histogram measurement memory 40, the processor 42 and the look-up table memory 44. The way in which these components operate is already described in detail above and will not be explained any further. The output signal of the look-up table memory 44 forms the input signal of a horizontal/vertical zoom circuit 46, a contrast circuit 48, a brightness circuit 50, an RGB amplifier 52 and a CRT $\gamma$-correction circuit 54. The output from $\gamma$-correction circuit 54 is applied to display 55. All these circuits can be found in prior art television receivers and do not require any further explanation.

The luminance signal Y is supplied, through an AGC-circuit 56, to both the histogram of measurement memory 40 as well as to the look-up table memory 44. The output of the histogram memory 40 is connected to a switch S10 (corresponding to S1 in FIG. 1). Switch S10 is coupled to a further five-position switch S12 and both switches are controlled in tandem by a window generator 58 that is controlled by a scene change detector 59. If the circuit needs data belonging to the left doming area window 32, the right doming area window 34, the left over-scan window 33, or the right over-scan window 35, then the window generator 58 takes care that the switches S10 and S12 are brought into the corresponding position. If none of these data is necessary, then the switches are brought to the lowest position in which the circuits 40, 42 and 44 are together functioning as described in the prior art publication.

If we assume that S10, S12 is in one of its four upper positions, then the output signal of histogram memory 40 is, first of all, supplied to a histogram correction circuit 60. In fact, the circuit 60 emulates the dynamic contrast function which is performed in circuit 44. Thereafter, the corrected signal is supplied to a circuit 62 where contrast and brightness correction are performed based on signals received from the contrast control circuit 48 and the brightness control circuit 50. A further signal supplied to the circuit 62 is derived from a beam current limiter 63. As such, the beam current limiter 63 is a circuit known from the prior art. The beam current limiter 63 takes care that, under no circumstances, the beam current reaches a higher level than a predetermined limit level. If necessary, the value at the input of circuit 62 is corrected in case the beam current limiter 63 provides an indication therefore.

The RGB amplifier 52 has, of course, its influence on the actual luminance signal, but in the emulation circuit, this influence is, in fact, a constant factor so that no connection between the RGB amplifier 52 and the correction circuit 62 is necessary. The influence of the CRT $\gamma$-correction circuit 54 is translated into the circuit 64 emulating the $\gamma$-correction.

The values at the output of the $\gamma$-correction circuit 64 are sent to a summing circuit 66 which at the output, in fact, supplies an estimation of the total beam current of the measured window:

beam current $=\Sigma$weight (bucket$\times$histogram (bucket), wherein weight (n) is the beam current of each pixel in the bucket number n and histogram (n) is the amount of pixels of the picture that fall inside it.

The beam current calculated so far depends on the window size because the total amount of pixels measured by the histogram changes linearly with the window size. Since the window changes due to 50 Hz/60 Hz reception conditions, a correction has to be added for which a window size compensation circuit 68 is added.

The prediction calculated so far tends to underestimate the doming effect of the beam current in cases where one part of the window is light and another is dark. As an example, take a scene with a light sky on the top 25% of the screen and a dark landscape on the rest. The average beam current of a window will not be high, being dominated by the large dark area. Still, the danger of local doming is large in the sky part. To compensate for this, a black/white balance correction circuit 70 is added where a correction is performed based on the light/dark distribution.

Depending on the selected window, the output signal of the black/white balance correction circuit 70 is supplied, through switch S12, to either the left part prediction circuit 72 or to the right part prediction circuit 74. These prediction circuits control the calculate correction circuit 76 which supplies the ultimate correction value to the histogram algorithm processor 42.

Instead of to the histogram algorithm processor 42, the correction signal could also be transferred back to the contrast controller 48 as indicated in FIG. 3.

As set out above, a preferred embodiment of the invention provides an electronic local doming prevention (ELDP) in which local histograms are determined at several locations, and in which a prediction of the beam current is carried out in predetermined areas of the picture. This embodiment is based on the idea to derive a prediction of the local doming of the shadow mask from the measurement of the local luminance histogram. Compared to prior art histogram measurements using only one measurement window to achieve a dynamic contrast control, in this embodiment, a switch is made between five windows, viz. one dynamic contrast control window plus four windows 32–35 for electronic local doming prevention. Once a histogram of an ELDP window is measured, software processing calculates the power load of the shadow mask from it.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A method of preventing doming phenomena, the method comprising:
    obtaining luminance histogram distribution values from a luminance signal;
    processing and normalizing the various luminance histogram distribution values;
    processing the luminance histogram distribution values to correct for at least actual contrast and brightness settings to obtain corrected histogram data;
    furnishing a predicted beam current from said corrected histogram data; and
    deriving a correction signal from the predicted beam current and making said correction signal effective in said processing and normalizing step.

2. A circuit for preventing doming phenomena, the circuit comprising:
    a histogram memory for obtaining a luminance distribution from a luminance signal;
    an operating circuit for processing and normalizing the various values in said histogram memory;
    means for processing the histogram data to correct for at least actual contrast and brightness settings to obtain corrected data;
    means for furnishing a predicted beam current from said corrected data; and
    means for deriving a correction signal from the predicted beam current and making said correction signal effective in said operating circuit.

3. The circuit for preventing doming phenomena as claimed in claim 2, wherein only the luminance signals corresponding to predetermined areas on the screen are taken into account to obtain local predictions of the beam current based on local histogram measurements.

4. The circuit for preventing doming phenomena as claimed in claim 3, wherein the predetermined areas cover elongated windows with relatively small horizontal dimension and relatively large vertical dimension at a predetermined distance from the right or left edge, respectively, of the screen.

5. The circuit for preventing doming phenomena as claimed in claim 4, wherein further predetermined areas cover elongated windows with relatively small horizontal dimension and relatively large vertical dimension adjacent to the extreme right or left edge, respectively, of the screen to compensate for a thermic-mechanic compensation of local doming.

6. The circuit for preventing doming phenomena as claimed in claim 2, wherein said histogram data processing means comprises means for correcting the data in agreement with intensity variations instructed by a look-up table memory having stored therein the processed and normalized histogram values.

7. The circuit for preventing doming, phenomena as claimed in claim 2, wherein the means for predicting the beam current comprises a summing circuit in which the values, received from the histogram memory after multiplication with a weight factor, are summed to obtain a weighted sum.

8. The circuit for preventing doming phenomena as claimed in claim 7, wherein the weighted sum is processed in a window size compensation circuit providing compensation for 50 Hz/60 Hz receiver circuits.

9. The circuit for preventing doming phenomena as claimed in claim 7, wherein the weighted sum is further processed in a black/white compensation circuit providing compensation for relatively large white surfaces within a window.

10. A television receiver comprising a cathode ray tube having a screen which a picture is produced by an electron beam under control of an electronic receiver circuit having intensity, contrast and brightness control means, said intensity control circuit being equipped with a local doming prevention circuit as claimed in claim 2.

11. A circuit for preventing doming phenomena, the circuit comprising:
- a histogram memory for obtaining a luminance distribution from a luminance signal;
- an operating circuit for processing and normalizing the various values in said histogram memory;
- means for processing the histogram data to correct for at least actual contrast and brightness settings to obtain corrected data;
- means for furnishing predicted beam current from said corrected data; and
- means for deriving a correction signal from the predicted beam current and making said correction signal effective in said operating circuit, wherein said circuit for preventing doming phenomena further comprises a switch coupled between the histogram memory and the histogram data processing means for selectively connecting the output of the histogram memory either with said histogram data processing means or with said operating circuit.

* * * * *